United States Patent

Howard, Jr. et al.

[15] 3,648,124

[45] Mar. 7, 1972

[54] GATED METAL-SEMICONDUCTOR TRANSITION DEVICE

[72] Inventors: Webster E. Howard, Jr., Yorktown Heights; Rudolf Ludeke, South Salem; Phillip J. Stiles, Yorktown Heights, all of N.Y.

[73] Assignee: International Business Machines Corporation, Armonk, N.Y.

[22] Filed: June 10, 1970

[21] Appl. No.: 45,143

[52] U.S. Cl. ..................317/235 R, 317/235 B, 317/235 AP

[51] Int. Cl. ..........................................................H01l 11/14

[58] Field of Search ..............317/238, 235 B, 235 AT, 234 S

[56] References Cited

UNITED STATES PATENTS

| | | | |
|---|---|---|---|
| 3,513,405 | 5/1970 | Carlson | 330/29 |
| 3,385,731 | 5/1968 | Weimer | 117/212 |
| 2,940,941 | 6/1960 | Dalton | 252/512 |
| 3,483,110 | 12/1969 | Rozgonyi | 204/192 |

*Primary Examiner*—John W. Huckert
*Assistant Examiner*—Martin H. Edlow
*Attorney*—Hanifin and Jancin and George Baron

[57] ABSTRACT

A semiconductor switch, using transition metal oxides, is provided that can be made to undergo a very sudden metal-to-semiconductor transition as a function of an electric field instead of as a function of temperature. Certain transition metal oxides act like semiconductors having valence and conduction bands. When enough mobile charge carriers move into the conduction band, the gap between the conduction and valence band disappears and the metal oxide acts like a metal. The metal oxide, which is being held at a temperature very close to its transition threshold, is employed with an insulated electrode (serving as a gate) capable of supplying mobile carriers to the metal oxide. When a proper bias is applied to the gate electrode, the metal oxide is switched into its high-conduction (metal) state, allowing the flow of current therethrough.

7 Claims, 5 Drawing Figures

INVENTORS
WEBSTER E. HOWARD, JR.
RUDOLF LUDEKE
PHILLIP J. STILES

BY [signature]
ATTORNEY

GATED METAL-SEMICONDUCTOR TRANSITION DEVICE

BACKGROUND OF THE INVENTION

Considerable interest has been shown in vanadium oxide ($VO_2$) since F. J. Morin's publication in the 1959 Physical Review Letters, Vol. 3, p. 34, reported a sharp transition in electrical resistivity at about 67° C. As much as 4 to 7 orders of change in resistivity in the transition metal oxides have been observed, and various oxides of vanadium, such as VO, $VO_2$ and $V_2O_3$, in thin film or crystalline form have been made to switch from their semiconductor states to their metallic states by raising their respective temperatures through their respective transition temperatures. Representative publications treating the thermal switching of the transition metal oxides from its high resistive state to its low resistive state are "The Nature of the Metallic State in $V_2O_3$ and Related Oxides" by I. G. Austin and C. E. Turner, published in the Philosophical Magazine, Vol. 19, No. 161, page 939, May, 1969.

"Transport Properties of Sputtered Vanadium Dioxide Thin Films" — D. H. Hensler — Journal of Applied Physics, Vol. 19, No. 5, April, 1968, pp. 2354–2360.

"Thin-Film Switching Elements of $VO_2$" — K. van Steensel et al. — Philips Research Reports 22, 1967, pp. 170–177.

"Insulating and Metallic States in Transition Metal Oxides" — David Adler — Solid State Physics, Vol. 21, Edited by F. Seitz et al. — Published by Academic Press, 1968, pp. 1–113.

In prior art devices, as discussed in the representative literature noted above, transitions from a high resistance state ($\rho \approx 10\Omega$) to a low resistance ($\rho \approx 10^{-4}\Omega$) state is accomplished within a fraction of a degree centigrade. For example, for single crystal $VO_2$, the ratio of resistance ($R_{sc}$) in the semiconductor state to resistance in the metallic state ($R_m$) just beyond a threshold temperature of 68° C. is equal to $10^5$. If the grown crystal of $VO_2$ is off stoichiometry, then the transition regions are not sharp.

Temperature control of switching devices, in general, is not desirable in many industrial applications, particularly where high switching speeds are required, in that the heat relaxation times of such devices are high, resulting in slow response. To offset such a shortcoming, the present invention provides an electric field, in contradistinction to a temperature control, to switch a transition metal oxide from its semiconductor state to its metallic state. It is immaterial, in the practice of the invention, whether the transition metal oxide, and in particular, the vanadium oxide, be in bulk form, or in thin film form, as set out in the above-noted van Steensel et al. article, save that different thicknesses, purity, stoichiometry, etc., of the selected material may alter the transition temperature, electric field, sharpness of transition, and other operating characteristics of the transition. Where bulk transition metal oxides are used, the electric field may penetrate only a thin layer of such bulk, but such layer could be the active region of interest.

A device for carrying out such electric field switching comprises an electrode supporting an insulating layer, such as $SiO_2$, and the transition metal oxide, such as, though not limited to, a film of $VO_2$ deposited over the $SiO_2$. Source and drain areas are formed in contact with the transition metal oxide as preliminary steps towards the making of a field effect device. The entire unit is heated so that it is maintained at a temperature ≈68° C., just below the transition temperature of the $VO_2$. Now when a voltage supply is connected between the gate electrode and the source or drain electrode of the $VO_2$ film, sufficient charge densities are induced in the $VO_2$ to change its transition temperature. Thus, in the vicinity of the transition temperature, the electric field produced by the gate bias serves to produce the transition normally produced by such temperature change, causing the entire device to act as an electrical switch.

The foregoing and other objects, features and advantages of the invention will be apparent from the following more particular description of the preferred embodiments of the invention as illustrated in the accompanying drawings.

DESCRIPTION OF THE DRAWINGS

In FIG. 1A is shown an example of an embodiment of the invention that contains a transition metal oxide and an insulator with a gate electrode so as to use the field effect, similar to that used in field-effect transistors, to change the transition temperature $T_c$ of that metal oxide. On a glass or other insulating substrate 2 are deposited, through conventional masking and vapor deposition techniques, two electrically conducting regions 4 and 6 which serve as source and drain regions, respectively, of a field-effect device to be built thereon.

Figure 1A:
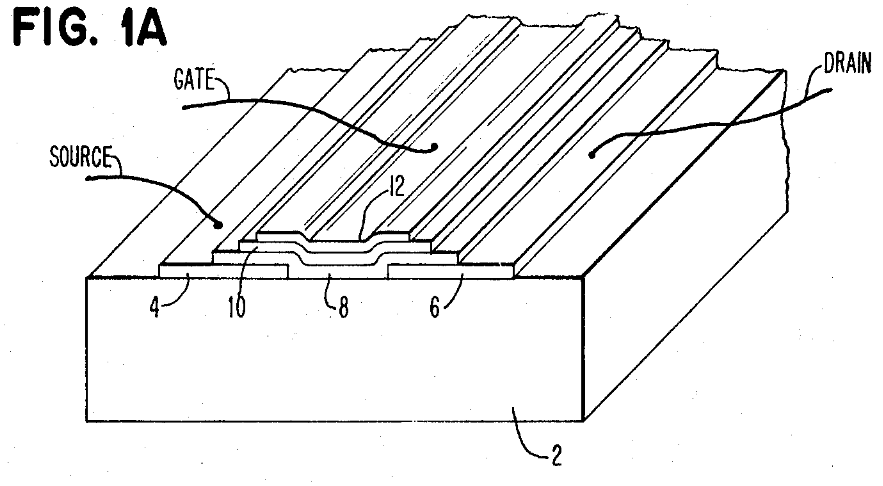
FIG. 1A is a schematic cutaway showing of an embodiment of the novel switch shown and described herein.

These regions are of the order of 1,000–10,000 A. in thickness. Over such regions is deposited a transition metal oxide layer 8 whose thickness is of the order of 1,000 A. An insulation layer 10 of the order of 100 A. to a few thousand angstroms is deposited over layer 8, such insulation being $SiO_2$, $Al_2O_3$, or the like. Deposited over said insulation layer 10 is a thin metallic layer 12, of the order of 1,000 A., the latter serving as a gate electrode.

By closing of switch 16, a voltage signal from battery 14 is applied to gate electrode 12, the applied electric field causing substantial charge densities to be induced in the transition metal oxide film 8, which in turn produces a change in its transition temperature, resulting in a rapid transition from its high resistive state to its low resistive state. Such change in resistivity allows current to flow from battery 18 through the novel switch into a suitable load resistor 20. The potential drop measured by voltmeter 22 across resistor 20 would indicate this change of state of metal oxide 8.

Figure 1B:
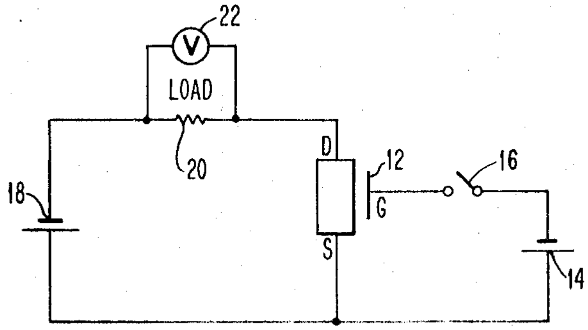
FIG. 1B is a schematic of a representative circuit using the novel switch.
Figure 2:
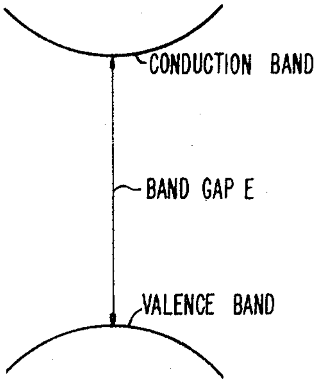
FIG. 2 is an energy diagram of a transition metal oxide.
Figure 3:
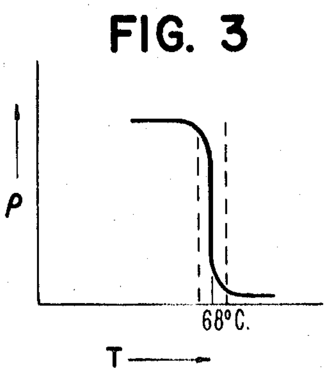
FIG. 3 is a plot of resistance versus temperature for a typical transition metal oxide.

While it is not certain as to what actually happens when the electric field is applied to the metal oxide, it is believed the following explanation will assist in understanding the operation of the device of FIGS. 1A and 1B. For a semiconductor, such as $VO_2$, the energy gap E between its conduction band and valence band is expressed by the relation $E = E_0 - \beta n$ where n is the free carrier concentration in the conduction band and $\beta$ is a constant. As the concentration of carriers in the conduction band increases, the energy E decreases. Such decrease in the value of E accelerates the number of electrons that can go into the conduction band from the valence band. Since the critical temperature $T_c$ of the metal oxide is a function of that carrier concentration n, a change in carrier concentration, produced by the electric field, will affect that critical temperature.

Figure 4:
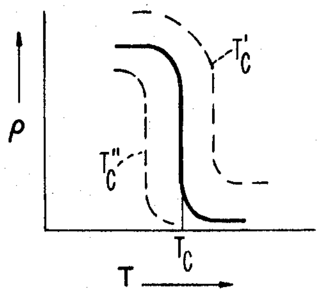
FIG. 4 shows how the plot of FIG. 3 varies with change in applied field.

If a negative voltage is applied to the gate electrode 12 via a battery source, such as battery 14, upon closing of switch 16, positive charges are induced in the metal oxide 8, and such positive charges will change the critical transition temperature $T_c$. If a positive voltage is applied between gate 12 and region 4, then negative charges are induced in the metal oxide film 8, and the critical transition temperature is changed in a direction opposite to that for the positive gate bias. FIG. 4 illustrates how the normal critical temperature $T_c$ is altered to either $T_c'$ or $T_c''$, depending upon whether the population of mobile charge carriers is reduced or enhanced in the metal oxide layer 8.

Although the device described herein operates in a manner similar to a field-effect device, it is distinct from such a device in that it produces a much better conductivity path in its low resistance state than in its high resistance state. In the conventional field-effect device, a change in voltage between gate electrode and a semiconductor produces a proportional, rather than a threshold, change. The transition metal oxide materials are particularly good candidates for operating as a threshold switch because they make the jump from semiconductor to metal within a fraction of a degree. A material selected from such group acts like it has a valence band and a conduction band. When enough mobile carriers are made to move into the conduction band from the valence band, a small structural change occurs in the material and the gap between the conduction and valence bands disappears, so that the material acts like a metal. To maintain said metal oxide in its high-conducting state, switch 16 remains closed so that the requisite induced carrier population for effecting the transition remains.

While the invention has been described for the preferred materials such as the oxides of vanadium, the chalcogenides of transition metals as well as the oxides of titanium are also candidates for use in the novel switch described above.

What is claimed is:

1. A switching device including a field effect structure comprising a source region and a drain region, an insulator in the vicinity of and overlapping said source and drain regions, a transition metal oxide, having a semiconductor to metal state transition at a critical temperature, interposed between and in contact with said insulator and said source and drain regions, said metal oxide being maintained just below its critical temperature, a gate electrode in contact with said insulator, and means for applying an electric potential between said gate electrode and said source to supply mobile charge carriers to said transition metal oxide so as to alter its transition temperature for operation in the metallic state.

2. The switching device of claim 1 wherein said transition metal oxide is in the form of a thin film.

3. The switching device of claim 1 wherein said transition metal oxide is in the form of a single crystal.

4. The device of claim 1 wherein said transition metal oxide is vanadium oxide.

5. The device of claim 1 wherein said transition metal oxide is replaced by a transition metal chalcogenide exhibiting a semiconductor-to-metal transition.

6. A switching device including a field effect structure comprising a gate electrode, a transition metal oxide layer, having a semiconductor to metal state transition at a critical temperature, in contact with said gate electrode, said metal oxide being maintained just below its critical temperature, an insulating layer on said metal oxide layer, a source and drain region connecting said insulating layer, and means for applying an electric potential between said gate electrode and said source to supply mobile charge carriers to said transition metal oxide and change its transition temperature and cause said metal oxide to switch from its semiconductor state to its metallic state.

7. The device of claim 6 wherein said transition metal oxide is an oxide of vanadium.

* * * * *